United States Patent [19]
Walley

[11] Patent Number: 4,867,624
[45] Date of Patent: Sep. 19, 1989

[54] TAMPER PROOF BOLT AND NUT

[75] Inventor: Rex D. Walley, Curlewis, Australia

[73] Assignee: Supedo Pty. Ltd., Sydney, Australia

[21] Appl. No.: 182,798

[22] Filed: Apr. 18, 1988

[30] Foreign Application Priority Data

Apr. 16, 1987 [AU] Australia .................. PI1505/87

[51] Int. Cl.⁴ .................. F16B 31/00; F16B 37/08
[52] U.S. Cl. ...................... 411/3; 411/432; 411/910
[58] Field of Search .......................... 411/1–5, 411/432, 910, 396

[56] References Cited

U.S. PATENT DOCUMENTS

| 3,191,486 | 6/1965 | Gibbens | 411/4 |
| 4,068,555 | 1/1978 | Volkman | 411/2 |
| 4,167,886 | 9/1979 | Seghezzi et al. | 411/4 |

FOREIGN PATENT DOCUMENTS 2352400  6/1974  Fed. Rep. of Germany .......... 411/2
2067699  7/1981  United Kingdom .................. 411/5

Primary Examiner—Neill R. Wilson
Attorney, Agent, or Firm—Leopold Presser

[57] ABSTRACT

A tamper proof fastening device includes a threaded portion, a tool engageable portion for engagement by a tool for rotation of the device and drive coupling means coupling the engageable portion and the threaded portion for transmission of rotation from the engageable portion to the threaded portion. The drive coupling means is frangible upon application of a torque in excess of a predetermined torque to the engageable portion. After fracture, the engageable portion is rotatable on the threaded portion without application of substantial torque thereto. The engageable portion includes a generally cylindrical bore and an annular inwardly directed flange at one end of the bore. The threaded portion is provided with an abutment adapted to engage with the flange to restrict against axial separation of the threaded portion and the engageable portion in a direction.

6 Claims, 4 Drawing Sheets

TAMPER PROOF BOLT AND NUT

This invention relates to a fastening device. In specific aspects this invention relates to nuts, bolts and screws.

There is a need to provide nuts, bolts and screws which are reasonably proof against being undone so as to restrict vandals and pilferers. Further, in certain security situations it may be desirable to secure some object in a way which will deter unauthorized persons from removing that object. Still further, in certain applications it is necessary to ensure that nuts, bolts and screws are not tightened beyond a particular torque.

The present invention provides a fastening device comprising a threaded portion, a tool engageable portion for engagement by a tool for rotation of the device and drive coupling means coupling the engageable portion and the threaded portion for transmission of rotation from the engageable portion to the threaded portion; and wherein the drive coupling means is frangible upon application of a torque in excess of a predetermined torque to the engageable portion whereafter the engageable portion will be rotatable on the threaded portion without application of substantial torque thereto.

Preferably the threaded portion is made of a softer material than the engageable portion.

Preferably the threaded portion and the engageable portion are provided with abutments restricting against axial separation in a direction.

Preferably the engageable portion comprises a generally cylindrical bore and an annular inwardly directed flange at one end of the bore.

In one instance the drive coupling means comprises engaged spline surfaces on the threaded portion and the engageable portion.

In one instance the drive coupling means comprises shear pins extending between the threaded portion and the engageable portion.

In one instance the drive coupling means comprises an adhesive bonding the threaded portion and the engageable portion.

In one instance the drive coupling means comprises an annulus located between and drive coupled to the threaded portion and the engageable portion. In this instance the threaded portion and the engageable portion may both be of substantially the same hardness and the annulus may be of softer material. In this last respect, the annulus may be formed of a synthetic plastics material.

The use of engaged spline surfaces as the drive coupling means is presently preferred and in this instance it is referred that the engageable portion comprises a generally cylindrical splined bore. The threaded portion may have a generally cylindrical outer surface which may also be splined or may, as initially formed, be without splines but which by being press-fitted into the engageable portion is caused to deform to interengage with the splined bore.

When the device of the present invention takes the form of a nut it will generally have the form in which the threaded portion comprises an internally threaded sleeve received within the engageable portion which will usually have a hexagonal prism outer surface for engagement by a spanner.

When the device of the invention takes the form of a bolt or screw it will generally have the form in which the threaded portion comprises an externally threaded shank received within the engageable portion which will usually take the form of a bolt head or screw head and which will commonly have a hexagonal prism outer surface for engagement by a spanner.

The fastening devices in accordance with this invention should find application as tamper-resistant fasteners and as controlled torque fasteners.

Specific constructions of nuts, bolts and screws in accordance with this invention will now be described by way of example with reference to the accompanying drawings in which.

Figure 1:
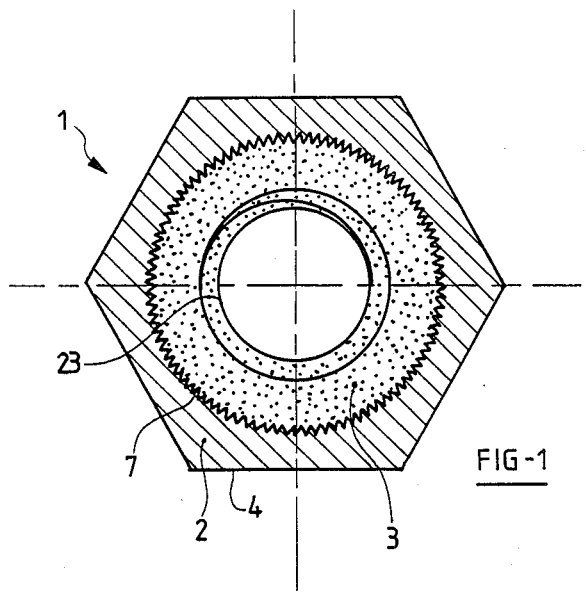
FIG. 1 is a top plan view of a nut in accordance with this invention.
Figure 2:
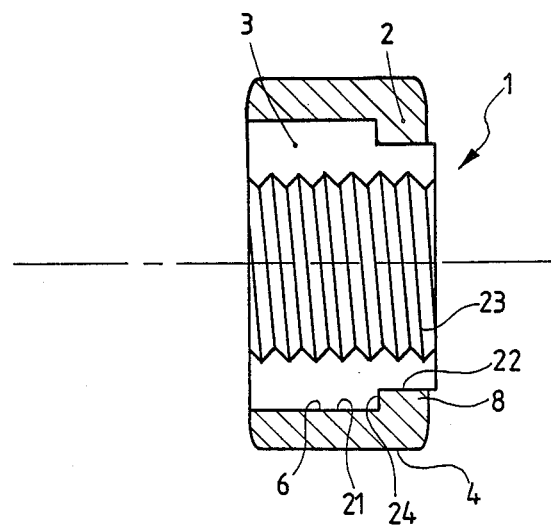
FIG. 2 is a cross-section on line II—II in FIG. 1.
Figure 4:
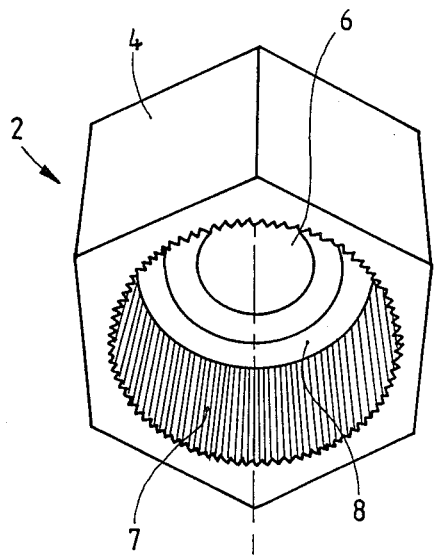
FIG. 4 is a perspective view of another part of the nut of FIG. 1.
Figure 3:
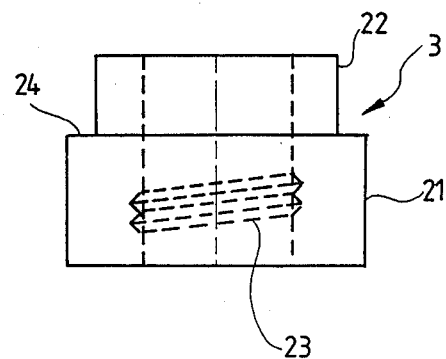
FIG. 3 is a side elevational view of a part of the nut of FIG. 1.

The nut 1 shown in FIGS. 1 and 2 comprises an outer part 2 and an inner part 3.

The outer part 2 has an outer surface 4 of hexagonal prismatic shape so that it may be engaged by a tool such as a spanner. Within the outer part 2 is a cylindrical bore 6 which is splined at 7. The outer part 2 also has an inwardly directed annular flange 8 at one end of the bore 6. The outer part 2 is formed of a relatively hard metal.

The inner part 3 has a cylindrical surface 21, a spigot end 22, an internally threaded bore 23 and an abutment 24. The surface 21, as formed in manufacture is not necessarily splined but may be plain. The diameter of the spigot end 22 is sized to be a clearance fit in the flange 8 with the abutment 24 abutting the flange 8 and the diameter of the cylindrical surface 21 is sized to be a tight press fit in the bore 6. The inner part 3 is formed of a relatively soft metal so that when press fitted into the outer part 2 with the cylindrical surface located in the bore 6 and the spigot end 22 located in the flange 8 it will be deformed by and engage with the spline at 7.

Because of the engagement of the spline at 7 with the cylindrical surface 21, the outer part 2 and inner part 3 will be drive coupled but as a frangible coupling.

In use the nut 1 shown in FIGS. 1 and 2 can be screwed onto a bolt with the flange 8 and spigot end 22 leading. The bolt will engage with the internally threaded bore 23 and the nut 1 can be tightened onto the bolt by a spanner engaged with the surface 4.

Once the nut 1 is tightned to a certain torque, further application of torque on the surface 4 by the spanner will result in the shearing of the coupling of the cylindrical surface 21 to the spline at 7. The result will be that the outer part 2 is no longer drive coupled to the inner part 3 and the outer part 2 can rotate on the inner part 3 without imparting substantial torque thereto.

Further, the outer part 2 will be captured on the bolt and be non-removable therefrom as a result of abutment 24 abutting flange 8.

Thus the nut 1 shown in the drawings once the coupling to the inner part has sheared will be resistant to tampering in that the use of spanner, wrench, pliers or other tool on the outer part 2 will not be likely to rotate the inner part 3.

Further, since the outer part 2 is made of a relatively hard metal the relatively soft metal inner part 3 will be protected against sawing or filing by that relatively hard metal.

If it is desired to remove the nut 1 when so secured to a bolt it will probably be necessary to drill, gas cut or friction cut.

In instances in which the nut 1 is to be used as a controlled torque nut the inner part 3 need not be made of a relatively soft metal.

The metal of the inner part 3 and the outer part 2 should also be chosen to suit an individual requirement such as non-ferrous for corrosive environments such as marine.

Figure 5:
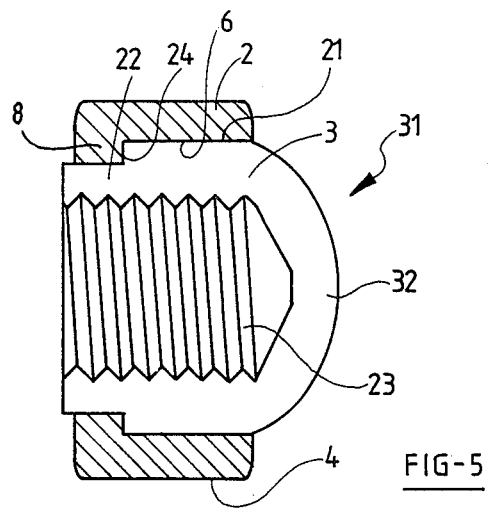
FIG. 5 is a cross-section view of another nut in accordance with this invention.

The nut 31 shown in FIG. 5 is similar to that shown in FIG. 1 and like numeral denote like parts. The nut 31 differs from the nut 1 in that the inner part 3 is provided with a domed end 32 for decorative reasons.

Figure 6:
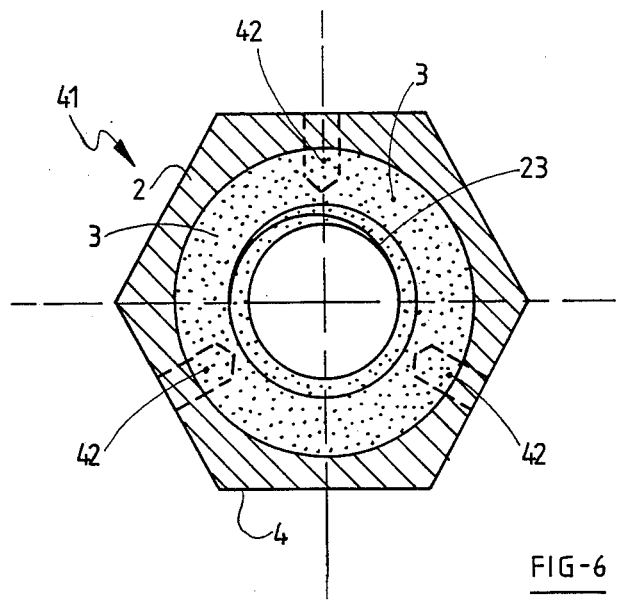
FIG. 6 is a top plan view of another nut in accordance with this invention.

The nut 41 shown in FIG. 6 is similar to that shown in FIG. 1 and like numerals denote like parts. The nut 41 differs from the nut 1 in that the spline in the bore 6 is omitted and in lieu shear pins 42 extend through the outer part 2 into the inner part 3. In use those shear pins 42 will shear at a particular torque. In this instance selecting the number, size and shear strength of the shear pins 42 will enable variation in the torque at which the pins 42 will shear. In the case of the nut 41, there is little reason for the inner part 3 and outer part 2 to be made of different metals.

Figure 7:
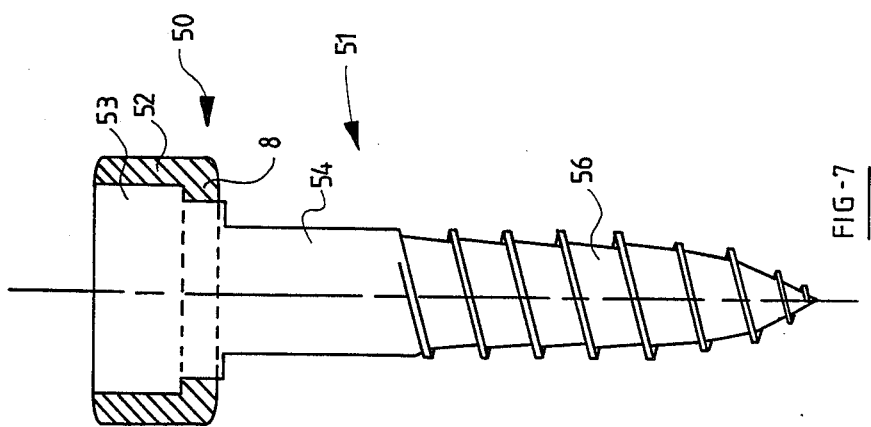
FIG. 7 is a side elevational view, partly in cross-section, of a screw in accordance with this invention.

The screw 51 shown in FIG. 7 has a head 50 comprised of an outer part 52 and an inner part 53.

The outer part 52 is identical to the outer part 2 described with respect to nut 1 above and like numerals denote like parts.

The inner parts 53 is identical to the inner part 3 described with respect to nut 1 above, and like numerals denote like parts, excepting that the bore 23 is omitted and there is a shank 54 having a threaded end 56.

The screw 51 will be usable in like manner to the nut 1.

Figure 8:
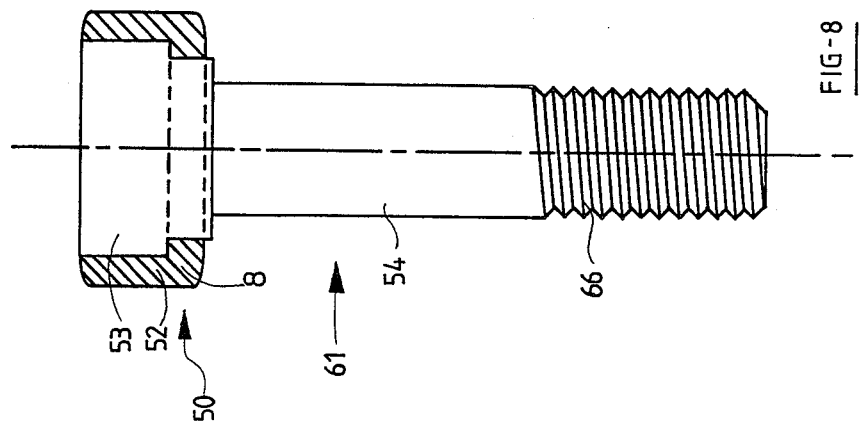
FIG. 8 is a side elevational view, partly in cross-section, of a bolt in accordance with this invention.

The bolt 61 shown in FIG. 8 is identical to the screw 51 of FIG. 7, and like numerals denote like parts, excepting that the shank 54 has a different form of thread 66.

The bolt 61 will be usable in like manner to the nut 1.

The above described nuts, screw and bolt should find application as tamper-resistant fasteners in securing objects. Particular applications are in securing street signs, road markers, toilet fittings but this is not to be considered to be exhaustive.

When fastening devices in accordance with this invention are used as tamper-resistant fasteners the particular torque at which the coupling will break is not particularly critical.

However, for controlled torque fasteners, the torque at breakage of the coupling is more critical and may be varied as desired by selection, with respect to the nut 1 above, of the diameter of the cylindrical surface 21, the difference between the root diameter and peak diameter of the spline at 7 and the shear strength of the material of the inner part 3 or by selection of the shear pins 42 with respect to the nut 41 above.

The claims and drawings form part of the disclosure of this specification.

The whole of the subject matter of the provisional specification previously lodged in respect of this matter is to be considered imparted hereinto.

The described arrangement has been advanced merely by way of explanation and many modifications may be made thereto without departing from the spirit and scope of the invention which includes every novel feature and combination of novel features herein disclosed.

I claim:

1. A fastening device comprising a threaded portion; a tool engageable portion for engagement by a tool for rotation of the device; and drive coupling means coupling the engageable portion and the threaded portion for transmission of rotation from the engageable portion to the threaded portion; wherein the drive coupling means is frangible upon application of a torque in excess of a predetermined torque to the engageable portion whereafter the engageable portion will be rotatable on the threaded portion without application of substantial torque thereto, and wherein the engageable portion comprises a generally cylindrical bore having an annular inwardly directed flange at one end of the bore and the threaded portion is provided with an abutment adapted to engage with said flange to restrict against axial-separation of the threaded portion and the engageable portion in a direction.

2. A fastening device as claimed in claim 1, wherein the threaded portion is made of a softer material than the engageable portion.

3. A fastening device as claimed in claim 1, wherein the drive coupling means comprises engaged spline surfaces on the threaded portion and the engageable portion.

4. A fastening device as claimed in claim 1, wherein the drive coupling means comprises shear pins extending between the threaded portion and the engageable portion.

5. A fastening device as claimed in claim 1, wherein the drive coupling means comprises an adhesive bonding the threaded portion and the engageable portion.

6. A fastening device as claimed in claims 1, 2, 3, 4 or 5 wherein said fastening device is one of a nut, bolt and screw.

* * * * *